(12) United States Patent
Hall et al.

(10) Patent No.: US 6,438,383 B1
(45) Date of Patent: Aug. 20, 2002

(54) SYSTEM AND METHOD RELATING TO PACKET DATA COMMUNICATION

(75) Inventors: Göran Hall; Johanna Karlsson, both of Mölndal; Hans-Olof Sundell, Öckerö, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/271,265

(22) Filed: Mar. 17, 1999

(30) Foreign Application Priority Data

Mar. 20, 1998 (SE) .............................. 9800930

(51) Int. Cl.⁷ ............................................. H04Q 7/20
(52) U.S. Cl. .................... 455/458; 455/466; 370/352
(58) Field of Search ................................. 455/458, 515, 455/574, 466, 456, 435; 370/338, 352, 311

(56) References Cited

U.S. PATENT DOCUMENTS

| | | | |
|---|---|---|---|
| 5,533,094 A | | 7/1996 | Sanmugam |
| 5,548,586 A | * | 8/1996 | Kito et al. .................. 370/349 |
| 5,729,534 A | | 3/1998 | Jokinen et al. |
| 5,918,181 A | * | 6/1999 | Foster et al. ................ 455/445 |

FOREIGN PATENT DOCUMENTS

WO            97/15167         4/1997

* cited by examiner

Primary Examiner—Thanh Cong Le
Assistant Examiner—Nick Corsaro
(74) Attorney, Agent, or Firm—Burns, Doane, Swecker & Mathis, L.L.P.

(57) ABSTRACT

A cellular communication system supporting packet data communication includes a number of switching arrangements for switching speech and/or circuit switched data. It also includes a number of packet data nodes, each controlling/serving the packet data communication in a number of packet paging areas. In each cell, a number of packet data communication channel resources are used for packet data communication, and each packet data node includes mobile station information handling devices keeping information about mobile stations registered in the cells covered by the packet data node. Cell information handling devices are further provided keeping information about packet data communication channel resources in the cells covered by the packet data node. Devices are provided for calculating which packet data communication channels are to be used for mobile stations after updating of a cell. Furthermore, devices are provided for keeping information about which cells have been updated and when a cell is updated. Paging of a mobile station in a stand-by state is performed by sending a number of first paging messages from the packet data node using the calculated packet data communication channel resources in all cells within the packet paging area in which the mobile station is registered. If the mobile station is not found, a second paging message is sent out to all cells which have been updated, advantageously on all packet data communication channel resources of such cells.

33 Claims, 10 Drawing Sheets

SYSTEM AND METHOD RELATING TO PACKET DATA COMMUNICATION

This application claims priority under 35 U.S.C. §§119 and/or 365 to 9800930-1 filed in Sweden on Mar. 20, 1998; the entire content of which is hereby incorporated by reference.

BACKGROUND

The present invention relates to a cellular communication system supporting packet data communication and including a number of packet data nodes controlling the packet data communication in a number of packet paging areas. The packet data nodes comprise mobile station information handling means keeping information about mobile stations registered in the cells covered by the packet paging areas in turn covered by the packet data node and cell information handling means keeping information about the packet data communication channels in the cells covered by the packet data node and means for paging mobile stations.

The invention also relates to an arrangement for paging mobile stations in a stand-by state in a cellular communication system supporting packet data communication. Still further the invention relates to a method of paging mobile stations in a stand-by state in a cellular communication system supporting packet data communication.

When a mobile station has been inactive for a predetermined time period, meaning that no packets have been received from a mobile station in a packet data node or transmitted to a mobile station, the mobile station enters a so called stand-by state or a packet stand-by state. One of the reasons for introducing such a stand-by state is to increase the life time of the battery used in the mobile station. A mobile station in stand-by state does not have to inform the network, or a packet data node, when it changes from one cell to another, but it only has to inform the network when it changes packet paging area. When a mobile station is in a stand-by state, it only listens to one intermittently sent time slot for packet paging messages. A cell may for example be divided into a number of packet paging groups each of which being assigned a particular time slot for paging messages. For example, in the PDC (Pacific Digital Communication) system the mobile station then only listens to one time slot per superframe for packet paging messages. This is described in RCR STD 27F, Personal Digital Cellular Telecommunication System ARIB Standard, issued April 30th, 1991 and last revised Feb. 18th, 1997, by Association of Radio Industries and Business. If the network, or particularly the packet data node, needs to transfer information to mobile stations being in the packet stand-by state, the network, or the node, has to wake-up the mobile stations by transmitting a packet paging message to the mobile stations in the respective packet paging group time slot assigned for paging of the mobile stations. If for example the cell parameters in a cell have been changed, i.e. the number of packet data communication channels, or particularly the time slot(s) used for packet data communication in a cell, the network (the packet data node) has to broadcast information about the new cell parameters in the changed cell. A reason for changing the cell parameters, particularly the packet data communication channel resources, may be that the traffic load in the cell changes. The packet data node then uses the time slot assigned to the packet common group for such information. The packet data nodes of the network will always be informed when a mobile station enters the packet stand-by state and when there is a need to broadcast common information, such as the cell parameters, all mobile stations being in the packet stand-by state have to be woken-up. This is done by the packet data node and it transmits a packet paging message which includes information about how many packet common group time slots that will carry the broadcast information. The broadcast information is then transmitted in all time slots of the packet common groups as specified in the paging message. Thus, when information is broadcasted, the packet data node first transmits a packet paging message to wake-up all the mobile stations in the packet stand-by state in the concerned cell. The packet paging message is transmitted on all time slots belonging to the packet paging groups in the cell. The mobile stations on the other hand only listen to one time slot, namely the time slot assigned their own packet paging group. However, if a mobile station is not able to receive the packet paging message, for example depending on the actual physical location of the mobile station; it may for example be somewhere where it can not be reached by the paging message such as in a tunnel, behind a mountain or a large building or similar. Such a mobile station will consequently not receive the common information transmitted by the packet data node or by the network in general. Therefore, every mobile station which does not receive the packet paging message, will be lost by the network and all packet paging attempts by the network to find them will fail. The packet paging message is sent in one time slot in every cell in the packet paging area in which the mobile station is registered. A calculation of which-packet data communication channel, or which time slot(s) or functional channel, UPCH, which is one time slot on a packet data communication channel PPCH, is performed. The calculation of which UPCH(s) are to be used in a cell depends on the configuration of the cell, i.e. the number of packet data communication channels or particularly functional channels of which the packet data communication channels are composed. If the configuration changes, the packet data mode does not know whether the mobile station uses the old or the new configuration (which means the configuration after an update has been done in the cell i.e. after the cell has been upgraded), i.e. it does not know whether the mobile station listens to the "new" or the "old" functional channel. Thus, if the data communication resources in a cell are changed the resources to be used by a particular mobile station may be changed and if the mobile station does not receive such information, it will be lost. This is a serious drawback. The situation is different for speech and circuit switched data communication since the mobile stations within a location area continuously listen to the broadcast channel and therefore, for speech and circuit data communication the same problem does not occur.

What is needed is therefore a system, an arrangement and a method respectively through which mobile stations in a stand-by state or particularly packet stand-by state can be paged in a safe and reliable manner with a minimized risk of mobile stations being lost by the network. A system, an arrangement and a method are also needed through which paging of mobile stations can be performed in a fast and efficient manner and without wasting communication resources. A system, an arrangement and a method is also needed to enable an improvement in hitherto known system, or for providing existing systems with a safeguarding mechanism, or a fall-back, in case a mobile station has missed the broadcast information.

Therefore a cellular communication system as referred to above is provided in which each packet data node comprise mobile station information handling means keeping information about the mobile stations registered with the cells covered by the packet paging areas in turn covered by the respective packet data node and cell information handling means for keeping information about packet data communication channels in the cells covered by the packet data node. Means are further provided for calculating which packet data communication channel resources are to be used for the mobile stations after an update (upgrading) of a cell, which means that the (number of) packet data communication channel resources in a cell is altered. Means are provided for paging a mobile station in a stand-by state through the sending of a number of first paging messages from the packet data node using the packet data communication channel resources, as calculated by the calculating means, in all cells within the packet paging area in which the mobile station is registered. The system also includes means for keeping information about whether a mobile station to which a number of first paging messages is/are sent is found or not, and means for sending a second paging message, for mobile stations which have not been found, to all cells which have been updated and on all packet data communication channel rescources of such cells; at least the cells in which the mobile station is not registered.

Particularly a mobile station registered with the packet data node for packet data communication enters a packet stand-by state when no packet data has been communicated to/from the mobile station for a predetermined time period. The packet data node comprises means for keeping information on mobile stations being in the packet stand-by state. Particularly a packet data communication channel using one frequency is composed of a number of functional channels. Each functional channel corresponds to one time slot on said frequency. A packet data communication channel may particularly comprise one, two or three functional channels, or, in other words a packet data communication channel uses one, two or three time slots on one and the same carrier frequency. In the following a packet data communication channel also is referred to as a PPCH (Packet Physical Channel) whereas a functional channel also is referred to as a UPCH (User Packet Channel).

In the calculating means a calculation is performed to calculate which packet data communication channel resource is to be used by a mobile station in a stand-by state after a cell update. The calculating means then calculates which UPCH in the respective cell that is to be used (for paging messages). In an exemplary embodiment a first paging message is sent on the calculated UPCHs in all cells within the packet paging area in which the mobile station is registered. In an alternative embodiment a number of first paging messages are sent in such a manner. In a particular embodiment the number of first paging messages is configurable. Particularly the second paging message is sent on all UPCHs of all packet data communication channels in all updated cells within the packet paging area. In a particular embodiment the mobile station information handling means keeps information about data communication traffic events for the mobile stations in the packet paging area. Hereby is meant information about transmission of data packets to the mobile stations or reception of data packets from the mobile stations in the packet paging area as well as periodical registration messages sent with a given or configurable regularity from the mobile station to the PDN, which may be done also when the mobile is in a stand-by state. The mobile station information handling means further includes means for keeping information about the times at which such events occur.

In an advantageous embodiment the mobile station information handling means includes mobile station time stamping means for stamping the time of each data communication event and at least the latest time stamp, relating to the last event, is stored. Furthermore information about the data communication channel, and particularly the functional channel(s) used at such events, is also stored.

In the exemplary embodiment the cell information handling means keeps information about which packet data communication channels are used in each cell within the packet paging area, including information about which are the UPCHs corresponding to said packet data communication channels and particularly said information handling means includes cell time stamping means for stamping the time when a cell is updated. In a particularly advantageous embodiment the cell information handling means contains a cell update flag which is set when a cell is updated and which is cleared when a time period has elapsed, which time period may be predetermined, fixed or reconfigurable, advantageously the time period for "flag set" is longer than the period at which periodical registration messages are sent out by the mobile station.

The packet data node may particularly include a paging timer for which a time interval is given, and upon the expiry of which a second paging message is sent out (unless the mobile station has confirmed that it has received a first paging message). Said paging timer may be initiated upon sending out of a first paging message, or if a number of first paging messages are sent out, e.g. upon sending out of the last first paging message.

Particularly the packet data node includes comparing means for comparing the time stamp of each cell in the packet paging area (or of each cell for which an update flag is set) with the time stamp of the mobile station and the second paging message is provided on all UPCHs in all cells, for which the cell time stamp shows a later time than the mobile station time stamp according to one embodiment.

In an advantageous embodiment the cell information means includes a table or similar keeping information about all cell identities, cell update time stamps, cell update flags, the packet paging areas to which the cell may belong and about which functional channels the packet data communication channels are composed of.

In an alternative embodiment the second paging message is sent on all functional channels of all packet data communication channels of all updated cells in the packet paging area except for the cell in which the mobile station is registered. In that cell, in case it has been updated, the second paging message is sent on the packet data communication channel on which the mobile station is registered and on the packet data communication channel which is calculated by the calculating means. If the mobile station is not found, although it probably will be found, a third paging message may be sent out, in that particular cell only, but on all UPCHs of that cell (possibly with exception of the UPCHs on which the second paging message was sent). In another advantageous embodiment, however, the second paging message is sent on all UPCHs also in that cell. That minimizes the risk of not finding the MS with the second paging message.

Therefore also an arrangement for paging a mobile station in a cellular communication system supporting packet data communication is provided. The arrangement comprises a packet data node, which controls a number of cells grouped into paging areas, and which contains mobile station information handling means keeping information about the mobile stations and cell information handling means is provided keeping information about packet data communication channel resources in the cells. The arrangement furthermore includes calculating means for calculating which packet data communication resources should be assigned to mobile stations after a cell update and paging means is provided for sending a number of first paging message(s) on the new calculated packet data communication channel resource in all cells within the packet paging area in which the mobile station is registered. Furthermore means are provided for detecting whether a mobile station has confirmed reception of the paging message and for sending out a second paging message if no confirmation has been received. The second paging message is sent out to all cells in the packet paging area having been updated and, in one embodiment, on all packet data communication channel resources of such cells. (By all updated cells is meant all cells having been updated after a mobile station has been in contact with the packet data node).

Particularly a packet data communication channel using one frequency is composed of one, two or three functional channels, each of which corresponds to one time slot on the frequency. Advantageously, in the calculating means, is also calculated which functional channel(s) on the packet data communication channel is/are to be used for paging messages to the mobile station. In an exemplary embodiment the first paging message is sent on the calculated functional channels in all cells within the packet paging area. In a particular embodiment this first paging message can be sent out more than once; the number of first paging messages being sent out may be configurable.

In the exemplary embodiment the second paging message is sent on all functional channels of all packet data communication channels in all updated cells within the packet paging area. In a preferred embodiment the mobile station information handling means keeps information about data communication traffic events concerning the mobile station and a mobile station time stamping means is provided for stamping the time at which such events occur. Furthermore cell information handling means keeps information about which PPCHs are used in each cell within the packet paging area, including information about which functional channels of the respective PPCHs that are used and furthermore cell time stamping means are provided for providing a time stamp when the cell is updated. Preferably the packet data node includes a paging timer for which a time interval is given, upon the expiry of which a second paging message is sent out. Said timer is initiated at sending out of the first paging message, or, alternatively, if more than one first paging message is sent out, upon sending out of the last first paging message. Alternatively a number of first paging messages can be sent out during a predetermined time period in which case the timer is initiated upon the first transmission of the first paging message. The second paging message is sent out to all cells in the packet paging area having being time stamped at a later occasion than the concerned mobile station has been time stamped.

Therefore a method of paging a mobile station in a cellular communiation system supporting packet data communication also is provided. It is supposed that the mobile station is registered in a packet paging area controlled by a packet data node. The method then comprises the steps of: sending a number of first paging message(s) to all cells within the packet paging area in which the mobile station is registered using up-to-date packet data communication channels in each cell; examining whether a confirmation is provided that the mobile station has received the first paging message, if no confirmation is provided, for each cell examining whether the cell has been updated since the last contact between the packet data node and the mobile station, and sending a second paging message to all cells having been updated since the last contact between the packet data node and the mobile station, which second paging message is sent on all packet data communication channel resources of such cells with the possible exception of the cell in which the mobile station is registered. The method particularly includes the steps of calculating which packet data communication channel resource the mobile station should use in the cell when the cell has been updated including calculation of which functional channel(s) among a number of functional channels of which the packet data communication channel is composed, the mobile station should use. Still further the method may include sending the first paging message on the calculated functional channel(s) in all cells within the packet paging area and sending the second paging message on all functional channels of all packet data communication channels in all updated data cells within the packet paging area. Particularly the method includes the steps of: stamping the time for packet data communication events relating to the mobile station, stamping each time when a cell is updated, examining which cells have been updated since the last time stamp relating to the mobile station and sending the second paging message to the cells having being updated after the last time stamp relating to the mobile station. The inventive concept can be implemented for performing paging of mobile stations for packet data communication but also for voice paging messages on the functional channels. It is an advantage of the invention that the risk of loosing a mobile station after a cell update is minimized. A further advantage of the invention is that the implementation is easy. It is also an advantage that actually no broadcast messages are needed due to cells being updated, but alternatively the concept can also be used as a fallback if a mobile station would miss some broadcast information. Furthermore it is an advantage that the radio traffic is reduced since there is no need to send broadcast messages as soon as a cell is updated. The invention can be implemented in any cellular communication system supporting communication of packet data, such as GSM (Global System for Mobile Communications) GPRS (General Packet Radio Service), P-PDC (Packet-PDC), packet data service in ADCM, AMPS etc.

BRIEF DESCRIPTION OF THE DRAWINGS

The invention will in the following be further described in a non-limiting way and with reference to the accompanying drawings in which.

DETAILED DESCRIPTION

Figure 1:
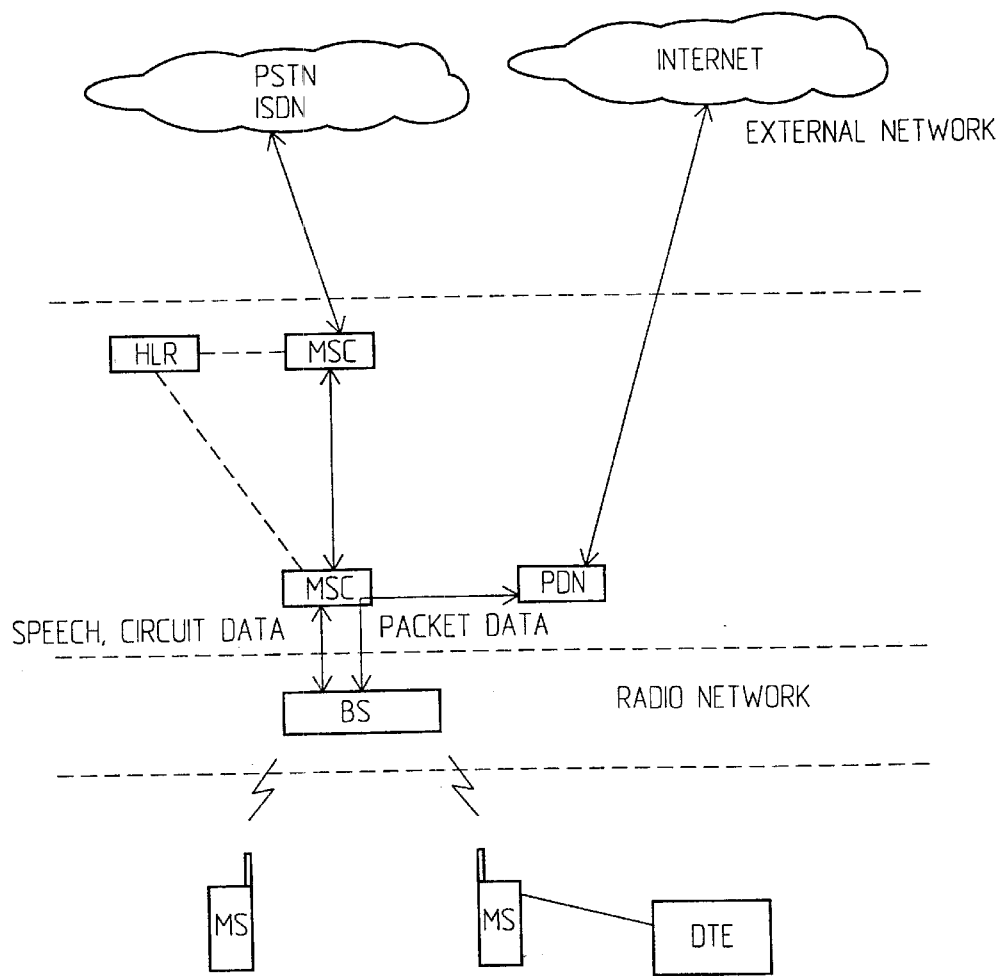
FIG. 1 schematically shows a mobile communication system supporting packet data communication, FIG. 2A schematically illustrates a packet physical channel consisting of one functional channel, FIG. 2B schematically illustrates a packet physical channel consisting of two functional channels, FIG. 2C schematically illustrates a packet physical channel consisting of three functional channels, FIG. 3A schematically illustrates a packet data node paging a mobile station in a packet paging area through sending a first paging message.

FIG. 1 very schematically illustrates a cellular communication network supporting communication of speech and circuit switched data as well as communication of packet data. Packet data communication services are provided for mobile users based on TCP/IP (Transmission Control Protocol/Internet Protocol) with hosts on external networks such as for example Internet. PSTN in FIG. 1 illustrates Public Switched Telecommunications Network and ISDN is the Integrated Services Digital Network. The cellular communication network in a conventional manner comprises a number of mobile stations MS, base stations BS, mobile switching centers MSC and home location registers HLR etc. As implemented for packet data communication the packet data node PDN performs packet switching functions such as packet routing and forwarding between mobile users and the IP (Internet Protocol) based network. The MSC and the PDN may also be implemented in a combined form and not separately as illustrated here. The MSC in addition to acting as a conventional mobile switching center also performs packet data service subscription checks in conjunction with a packet data communication request. The MSC is also responsible for the configuration of the radio network resources necessary for implementing the packet data service. Packet data service user data and control signalling data exchanged between a base station, which here implements the packet radio interface, and the packet data node PDN is also carried semipermanently through the MSC. The home location register HLR maintains subscription information on the subscribers, e.g. indicating if packet communication is allowed or not. A mobile station MS may generally be in one of three different states, namely a circuit state in which it is used for circuit speech/data communication, a packet state when the MS is used for packet data communication and a stand-by state in which the MS neither is used for circuit speech/data nor for packet data communication. In addition thereto it can be in a packet stand-by state, as defined in RCR STD-27F as referred to earlier in the application and which is incorporated herein by reference, which a mobile station, which is registered in a packet data communication state, enters when it has not received or sent any packets for a predetermined period of time (which may be reconfigurable). However, the invention is by no means limited to the PDC-system; it merely constitutes as particular example, the PDN may e.g. correspond to the SGSN-node (Service GPRS Support Node) of GSM or the P-MSC (packet MSC of PDC); however, these are two implementations among many others. Each packet data node PDN controls one terminal registration area TRA (not shown). Each terminal registration area covers a number of packet paging areas PPAs such as for example round 20 PPAs and each PPA may for example comprise round 25–35 cells. Each packet data node PDN serves a terminal registration area covering a number of PPAs (with the present standards maximum 255 PPAs throughout the network although the invention is of course not limited thereto). In an advantageous embodiment a packet paging area coincides with a location area (LA) which is a concept used for speech/circuit data communication. However, a PPA does not necessarily correspond to a LA it can be smaller as well as larger. One reason for having a PPA coinciding with a LA is that there is no need for two different structures within the system. A PPA may however also be smaller, which reduces the amount of information that is sent over the air.

The base stations means provides a layer 1 functionality of the packet physical channel (PPCH) according to the above mentioned standard. A PPCH is defined to use 1–3 time slots on one frequency and a time slot on the PPCH is defined as a user packet channel (UPCH). Two transmission procedures are available, either with channel coding or without. The BS provides and administrates the links towards the PDN via MSC and one PPCH within one transceiver may be carried in a 64 kbps time slot of its own. The mobile station supports a packet data procedure towards the network according to the above mentioned standard and it also supports a digital terminal equipment (DTE) interface to connect a PC.

Figure 2A:
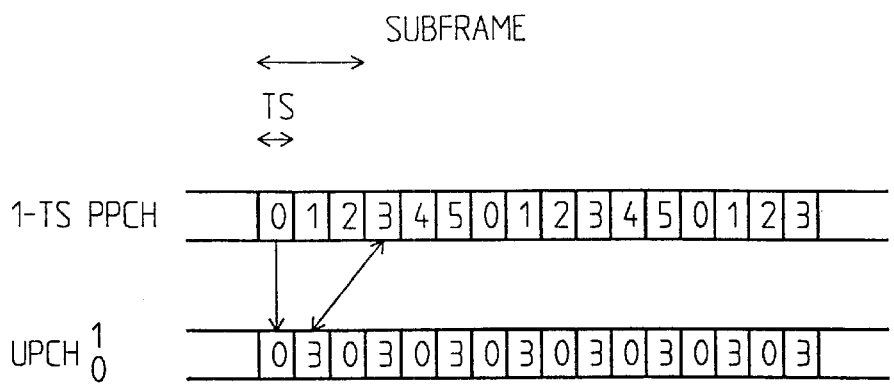

Thus, for packet data communication so called packet physical channels (PPCHs) are used. A PPCH, in one particular embodiment discussed for illustrative purposes, forms superframes comprising 36 subframes and hyperframes which consists of multiple superframes. A functional channel (UPCH) for both uplink and downlink is assigned to all subframes for each slot which form the PPCH. A 1-TS PPCH consisting of one functional channel $UPCH_1^0$ is shown in FIG. 2A. The subframe here comprises three time slots. The 1-TS PPCH here is composed of time slots TS0+TS3.

Figure 2B:
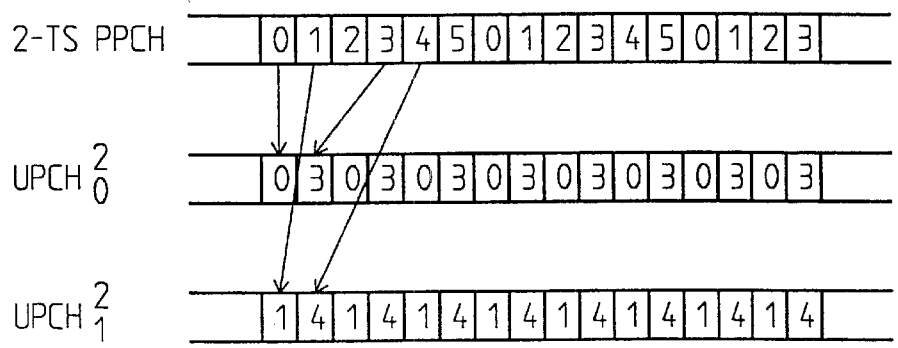

FIG. 2B shows a 2-TS PPCH composed of functional channels $UPCH_2^0$ and $UPCH_2^1$ The 2-TS PPCH of FIG. 2B is composed of TS0+TS3 and TS1+TS4.

Figure 2C:
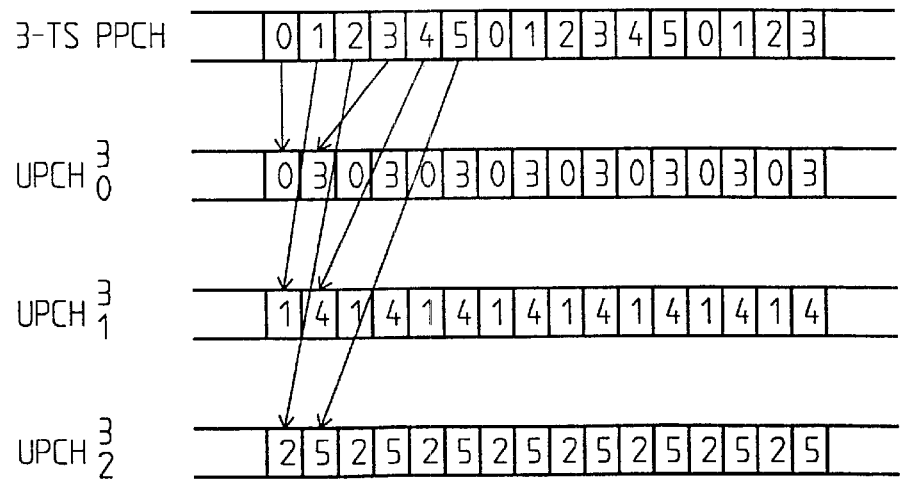

In a similar manner FIG. 2C shows a 3-TS PPCH composed of functional channels $UPCH_3^0$, $UPCH_1^3$ and $UPCH_2^3$ corresponding to TS0+TS3, TS1+TS4 and TS2+TS5 respectively.

Figure 3A:
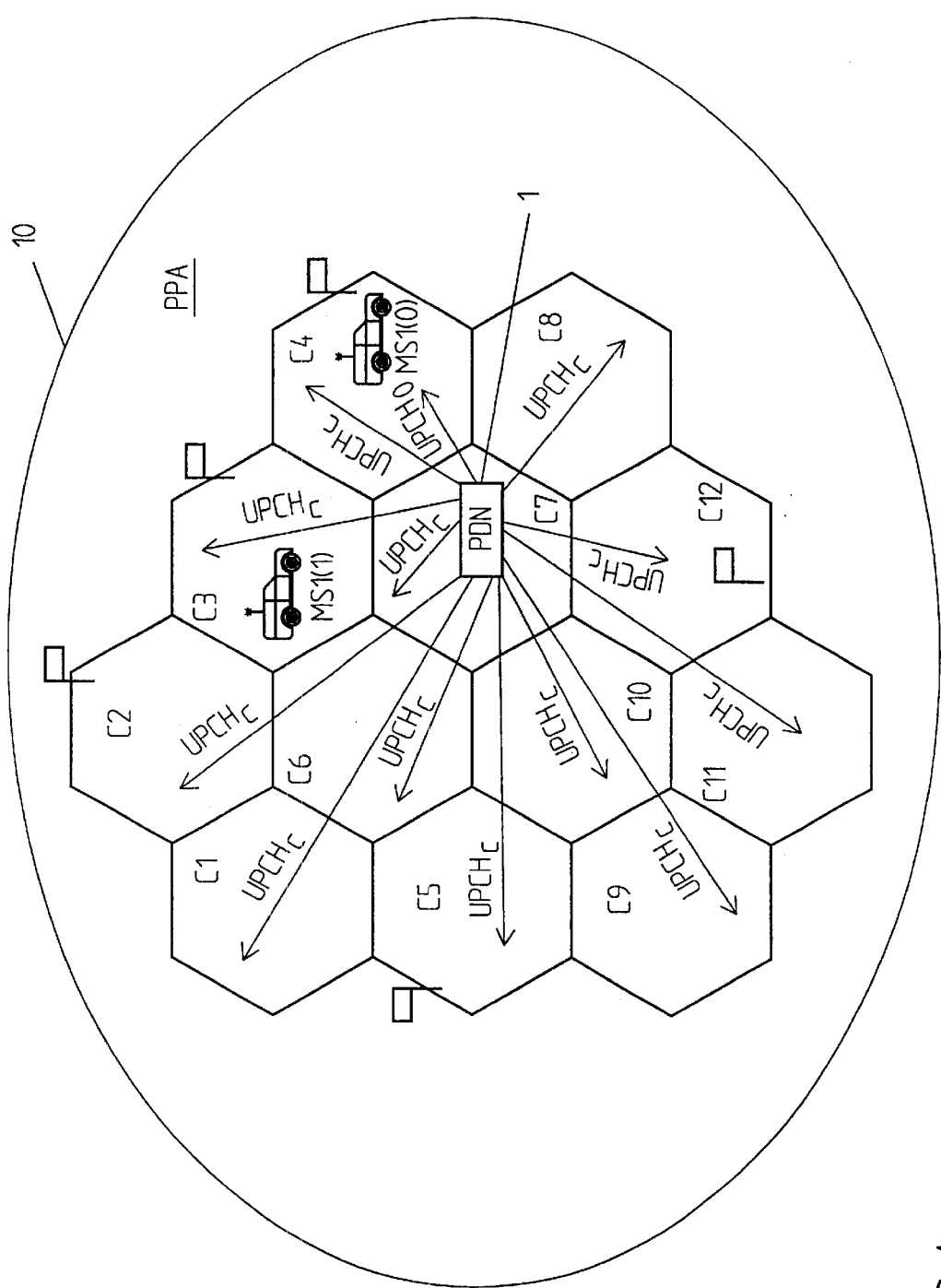
FIG. 3B is a figure similar to that of FIG. 3A in which a second paging message is sent for paging the mobile station according to a first embodiment.
FIG. 3C is a figure similar to that of FIG. 3A in which a second paging message is sent according to a second embodiment.
FIG. 3D illustrates the sending of a third paging message which may be implemented in case the paging as in FIG. 3C fails, FIG. 4 schematically illustrates the content in a cell information handling means in a packet data node in an exemplary embodiment, FIG. 5 schematically illustrates paging of a mobile station which is in an un-updated cell, FIG. 6 schematically illustrates paging of a mobile station which is in an updated cell, FIG. 7 schematically illustrates functional channels to a mobile station in a cellular communication system supporting packet data communication.

FIG. 3A schematically illustrates a packet paging area PPA 10 covering a number of cells; in the figure merely cells C1–C12 are illustrated. In FIG. 3A a mobile station MS1 is shown. It is supposed that the last time MS1, indicated through MS1 (0), was in contact with the packet data node PDN 1 (e.g. packet data was received in PDN 1 or sent from PDN 1 to MS or a registration message was provided by MS1, MS1 was in cell C4. It is now supposed that MS1 needs to be paged and that cell C4 has been updated. The last time the mobile station was in contact with the PDN 1, the used packet data communication resource was $UPCH_0$. However, since C4 was updated, a calculation was done in the calculating means of the PDN1 to establish which channel resource for data communication MS1 should use after the update. It is supposed that the calculated resource is a functional channel, here called $UPCH_c$. However, MS1 has now moved to cell C3 indicated by MS1(1) meaning that MS1 at a later time is in C3. A first paging message is sent out to all cells within the PPA 10 using $UPCH_c$, i.e. the data communication resource that MS1 should use according to the calculations. Such a first paging message may be sent out a configurable number of times but it is here supposed that it is only sent out once. However, MS1 can not be reached and the reason for that is that MS1 has not been in contact or not registered with PDN 1 since the last cell update. In FIG. 3A flags indicate the cells which have been updated, namely cells C2, C3, C4, C5, C12. The first paging message is sent out to all cells C1–C12 on the respective calculated functional channels.

Figure 3B:
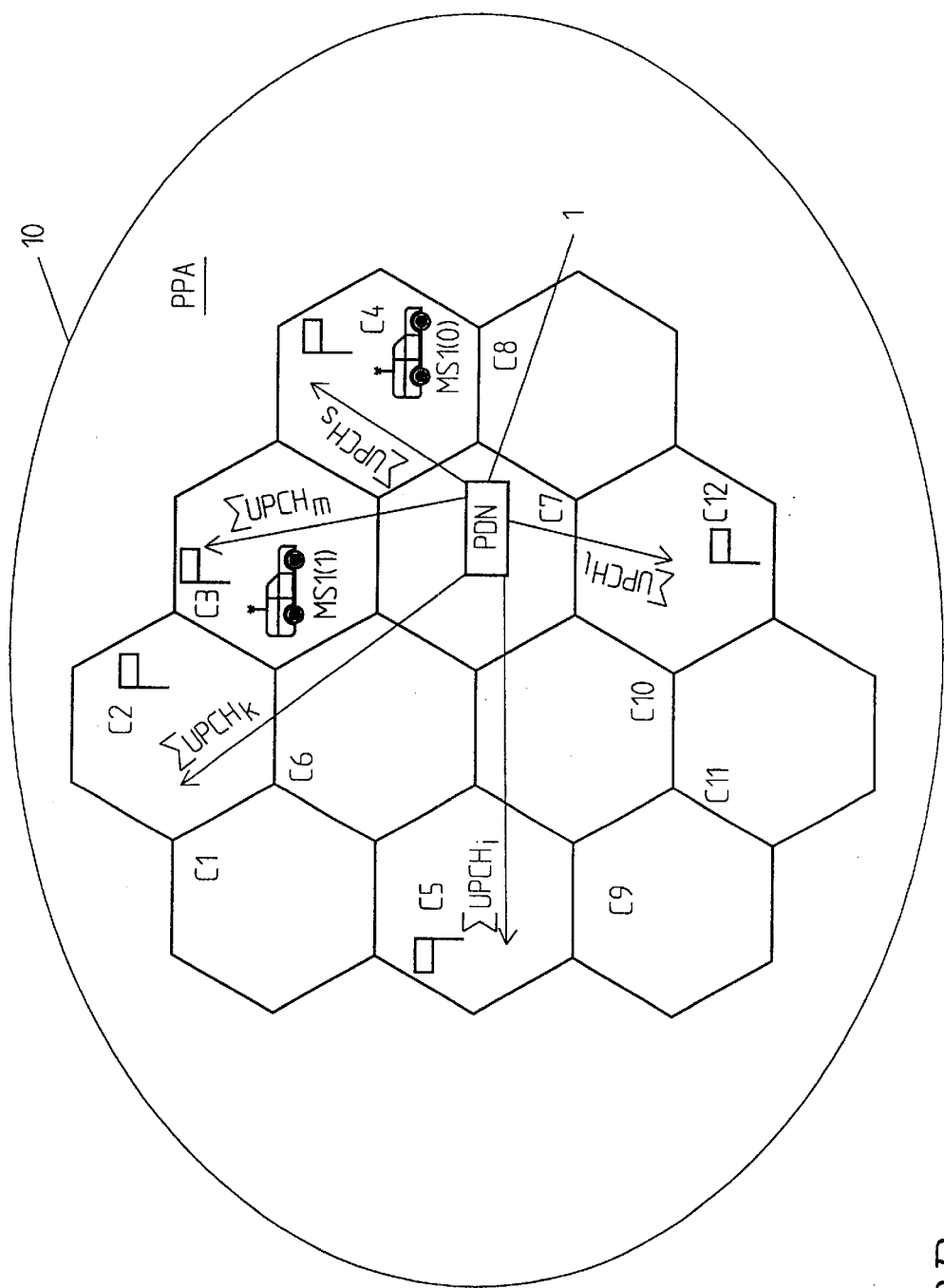

If however PDN 1 establishes that MS1 has not been found, i.e. there is no confirmation by MS1 to PDN1 that it has received the first paging message, a second paging message is sent out according to the present invention. This is illustrated in FIG. 3B. The second paging message is only sent out to the cells which have been updated since the last contact between the MS1 and the PDN1, i.e. the second paging message is sent out to cells C2, C3, C4, C5 and C12. The second paging message is sent on all PPCHs of the updated cells using every UPCH of each of the PPCHs of said cells. This means that if there for example are m UPCHs used in C3, the second paging message is sent on m UPCHs, in FIG. 3E denoted=Σ UPCH$_m$. Similarly if there are k UPCHs used in C2, the second paging message is sent on k UPCHs (Σ UPCH$_k$) in C2 and correspondingly on i UPCHs in C5 and on 1 UPCHs in C12. The same procedure in the embodiment as illustrated through FIG. 3B may be implemented in C4 which is the cell in which MS1 was located at its last packet data communication event, i.e. at its last contact with PDN 1. It is here supposed that there are s UPCHs in cell C4. The second paging message is then sent on all these UPCHs, Σ UPCH$_S$.

Figure 3C:
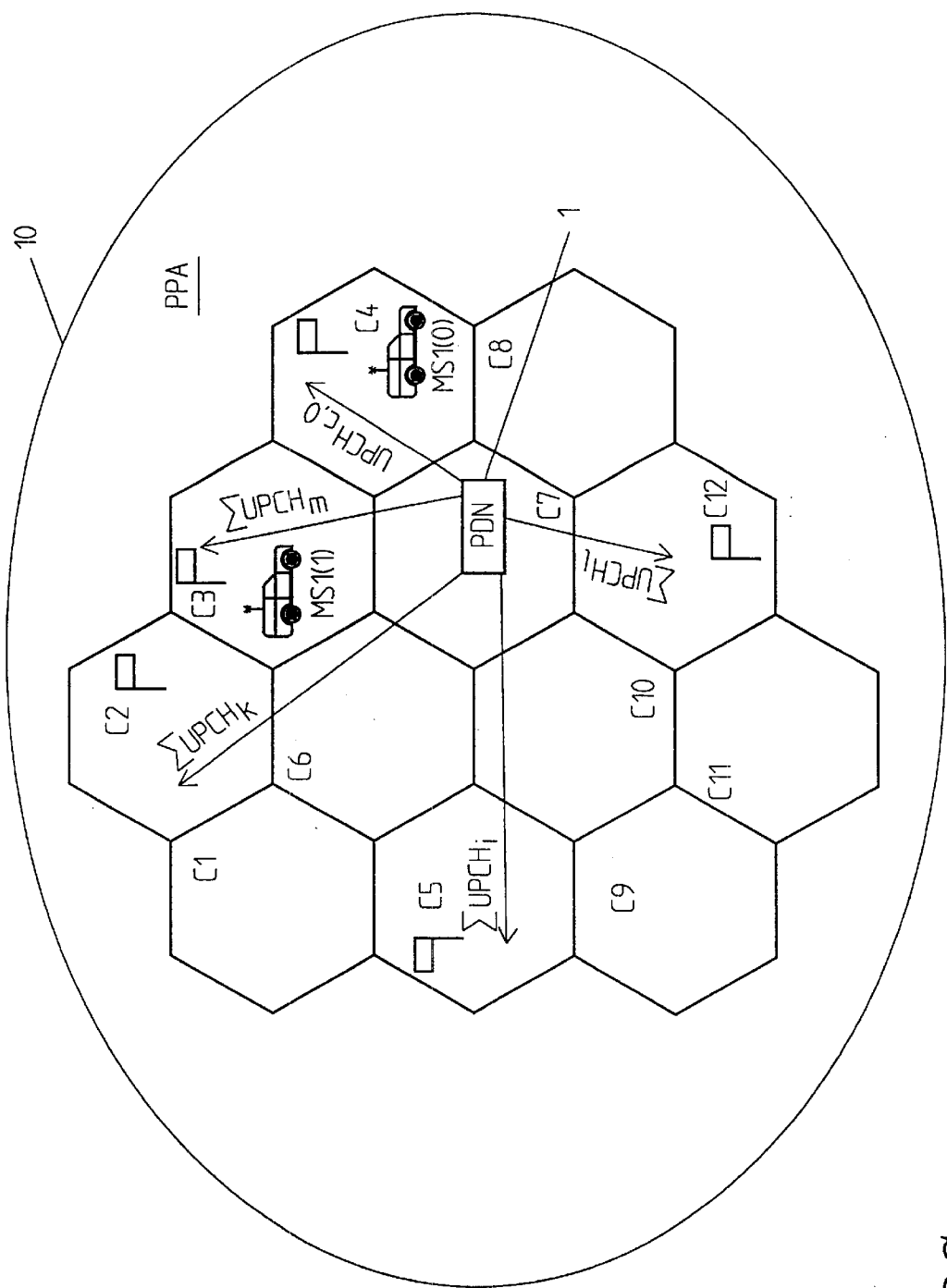

However, alternatively the second paging message is in C4 only sent on UPCH$_0$ and UPCH$_c$, as illustrated through FIG. 3C. Then may, however, a third paging message be needed which then is sent on all UPCHs of C4 (possibly with exception of UPCH$_c$, UPCH$_0$ on which already the second paging message was sent. This is illustrated through FIG. 3D.

MS1 will then be found in C3, through either of the embodiments. According to the present invention the network, or PDN 1, does not need to broadcast the information about the changed cell configuration.

PDN 1 contains cell information handling means containing a cell update time which is time stamped every time something is changed in the cell or every time the cell is updated. In an advantageous embodiment the cell information handling means also contains a cell update flag which is set when the cell is updated and cleared a configurable time later, which advantageously is longer than the registration period, i.e. the period with which registrations signals/messages are sent from MSC to PDN 1.

The PDN 1 also contains mobile station information handling means including a time stamp for the mobile station that is stamped every time the PDN 1 sends a packet to the mobile station or receives a packet registration message from the mobile station. This time stamp is stored in the mobile station information handling means. The first paging message is sent in the conventional manner as illustrated with reference to FIG. 5 but if the mobile station does not answer the paging message a second paging message will be sent out in the cells where the cell update flag is set (and possibly a third paging message if the second paging message is not sent on all UPCHs in C4).

It is further supposed that the PDN 1 comprises a paging timer and if the mobile station does not answer or confirm the/a first paging message within a predetermined time interval, i.e. before the paging timer expires, the second paging message will be sent out. For the cells in which the update flag is set, the cell time stamp is compared with the mobile station time stamp. If the cell time stamp for a particular cell shows a later time than the mobile station time stamp, the second paging message will be sent on all UPCHs in that cell, with the possible exception of cell C4, i.e. the cell in which MS1 is registered.

Figure 4:
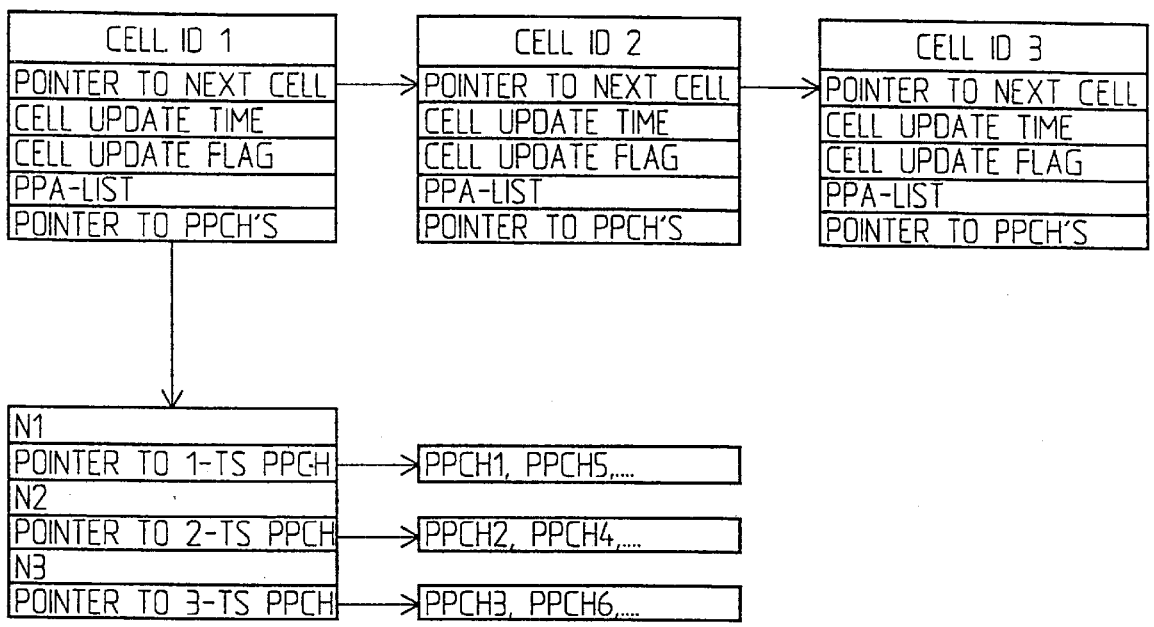

FIG. 4 shows one example on information kept in the cell information handling means in PDN 1. For each cell information is kept about the cell identity, cell ID1, cell ID2, cell ID3 including pointers to the next cell respectively. For each cell is furthermore information kept about the cell update time and a cell update flag. In addition thereto, for each cell there is information about which PPAs the cell may belong to since a cell may belong to more than one PPA 10. Furthermore, for each cell there is a pointer to the PPCHs used in the cell. In the figures N1 means the number of 1-TS PPCHs, N2 means the number of 2-TS PPCHs and N3 means the number of 3-TS PPCHs. It is here supposed that PPCH1 and PPCH5 are 1-TS PPCHs whereas PPCH2 and PPCH4 are 2TS PPCHs and finally PPCH3 and PPCH6 are 3-TS PPCHs. Since an UPCH is a TS on a PPCH, in this example there are twelve UPCHs, namely PPCH1, PPCH5 each containing one UPCH, PPCH2, PPCH4 each containing two UPCHs and PPCH3 and PPCH6 each containing three UPCHS. The second paging message is sent on all UPCH:s. This is done in all updated cells. In an alternative embodiment the second paging message is not sent on all UPCHs in the cell the mobile station was registered in when it last was in contact with PDN. In that cell it may be enough to page on the registered PPCH$_0$/UPCH$_0$ and on the calculated PPCH$_c$/UPCH$_c$ as discussed above. If, however, the mobile station still cannot be found, a third paging message PP3 is sent out in that cell on all UPCHs. Alternatively it may be sent in that cell on all UPCHs except on the ones on which the second paging message was sent.

Figure 5:
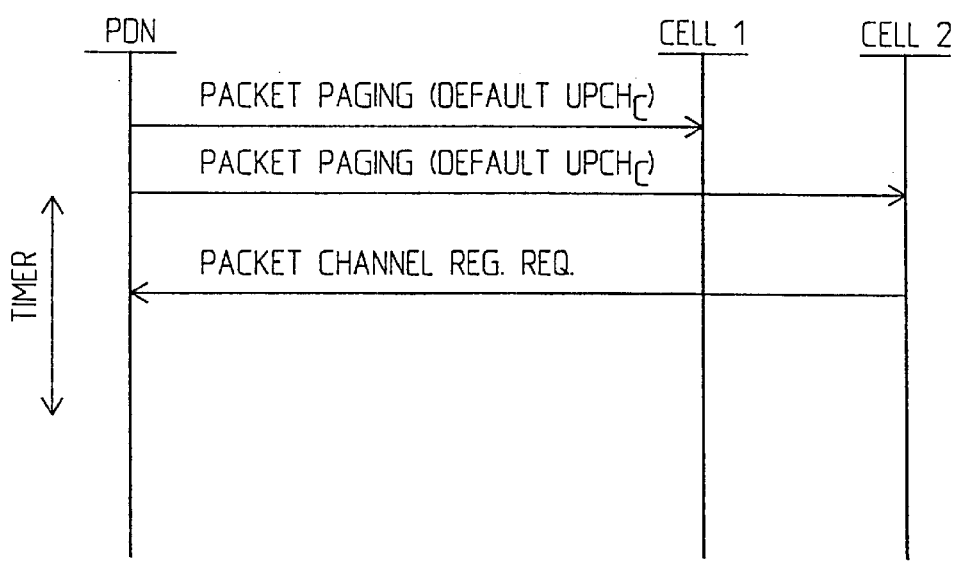

In FIG. 5 paging of a mobile station is illustrated when the mobile station is in an un-updated cell (i.e. a cell which has not been updated since the last contact with PDN). It is here supposed that the mobile station was time stamped in the MS information handling means at 13.00 whereas the cell information handling means indicates that cell 1 was time stamped at 14.00 whereas for cell 2 there is no time stamp. Thus the cell update flag is set for cell 1 and reset for cell 2. A packet paging message is then sent from PDN to cell 1 using the calculated (default) UPCH, UPCH$_c$. The packet paging message is also sent to cell 2 using the calculated UPCH$_c$ (default UPCH). The paging timer is initiated when the paging message is sent to cell 1 or cell 2 (here when it is sent to cell 2). It is in this case supposed that the mobile station is in cell 2 and in that it sends a packet channel registration request before expiry of the timer, to the PDN. Packet channel registration then proceeds in any appropriate manner.

Figure 6:
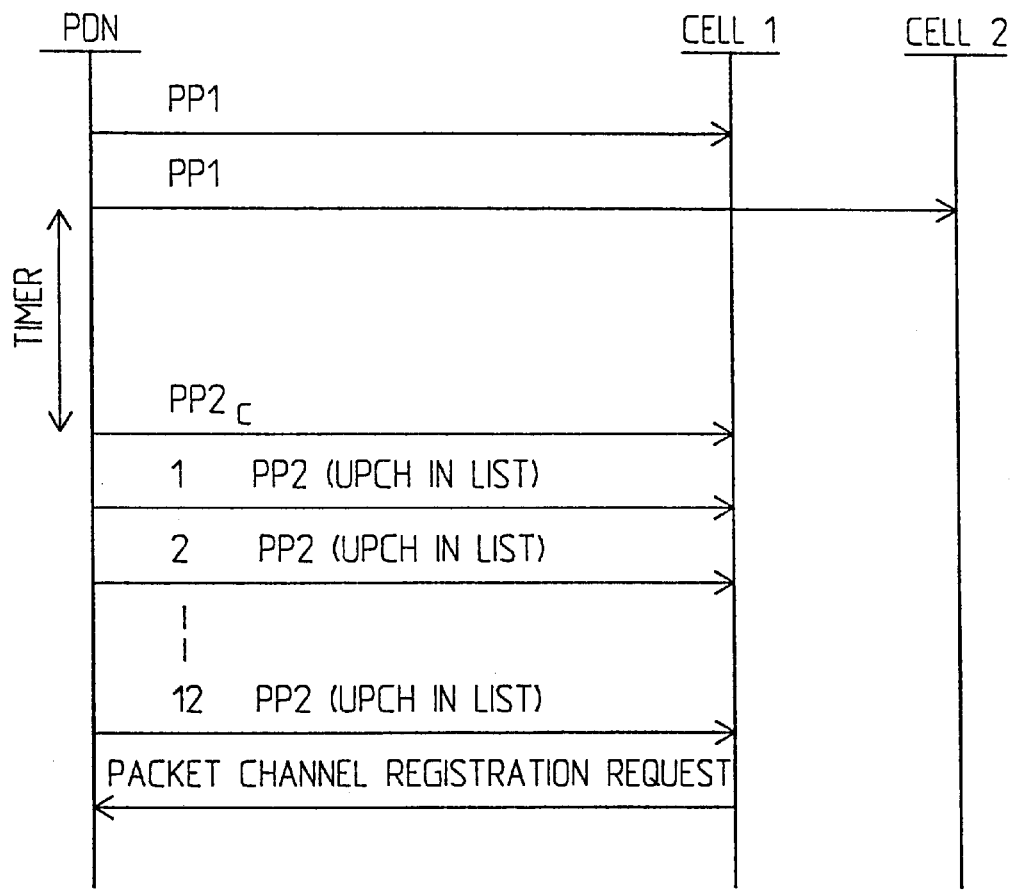

FIG. 6 schematically illustrates paging of a mobile station which is in an updated cell. Again it is supposed that the mobile station was time stamped at 13.00 whereas cell 1 was time stamped at 14.00 and cell 2 is not time stamped and that the cell update is flag set for cell 1. PDN then sends a first paging message, here simply called PP1, using the default UPCH$_c$ to cell 1. PDN also sends a first packet paging message PP1 to cell 2 using default UPCH$_c$. The timer is here initiated when PP1 is sent to cell 2. However, in this case no response or no confirmation is received in PDN from the mobile station that PP1 has been received. PDN then sends out a second paging message PP2 to cell 1 since cell 1 is the cell that was updated after the last contact between PDN and the mobile station, i.e. the time stamp of cell 1, 14.00, is later than the time stamp of the MS which is 13.00. PP2 is sent on the default PPCH (here called PP2$_c$) and on all the UPCHs contained in the list kept in the cell information handling means in PDN, in the case of FIG. 4, there are 12 UPCHs to which the second paging message are to be sent. The mobile station is then found in cell 1 and a packet channel registration request is sent from the MS to PDN and packet channel registration proceeds in a conventional manner.

Figure 7:
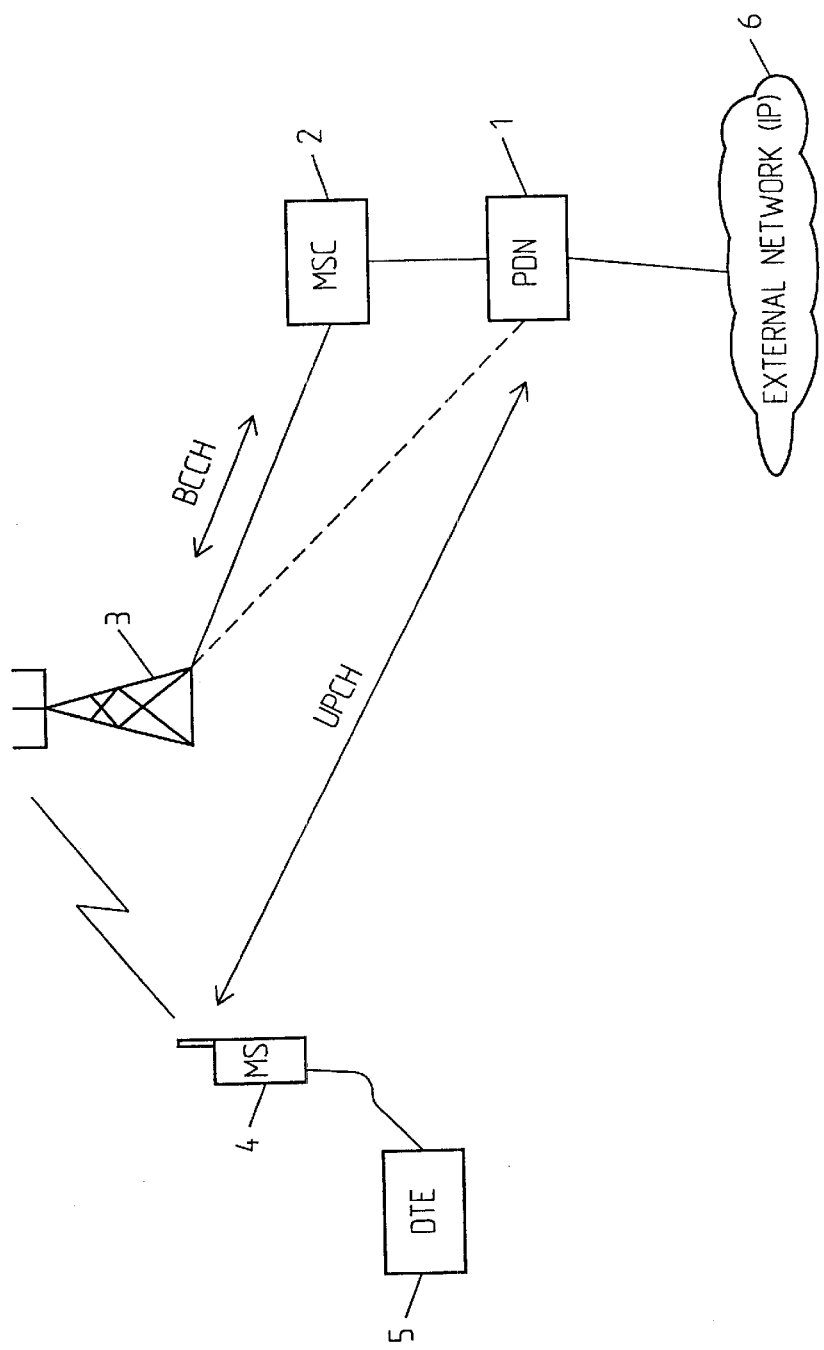

FIG. 7 schematically illustrates a mobile station MS4 to which a digital terminal equipment DTE 5, e.g. a PC, is connected. A packet data node PDN 1 is connected to MSC 2 which in turn connects to a base station BS 3. In an alternative embodiment, illustrated by a dashed line in FIG. 7, PDN 1 is directly connected to BS 3 by a cable. For packet data communication a packet data communication resource is used, here illustrated through the logical connection UPCH between the MS4 and the PDN 1. If the PDN 1 is connected to the base station BS 3 via the MSC 2, a semipermanent connection is provided through the MSC 2 and the traffic between the MS 4 and the PDN 1 can not be seen. Between the MSC 2 and the BS 3 a broadcasting channel BCCH is used for sending of information about cell updates etc. relating to the circuit switched communication. If the mobile station 4 is registered for packet data communication, it does not listen to BCCH but to UPCH whereas if it is attached to the cellular system it always listens to BCCH.

Figure 3D:
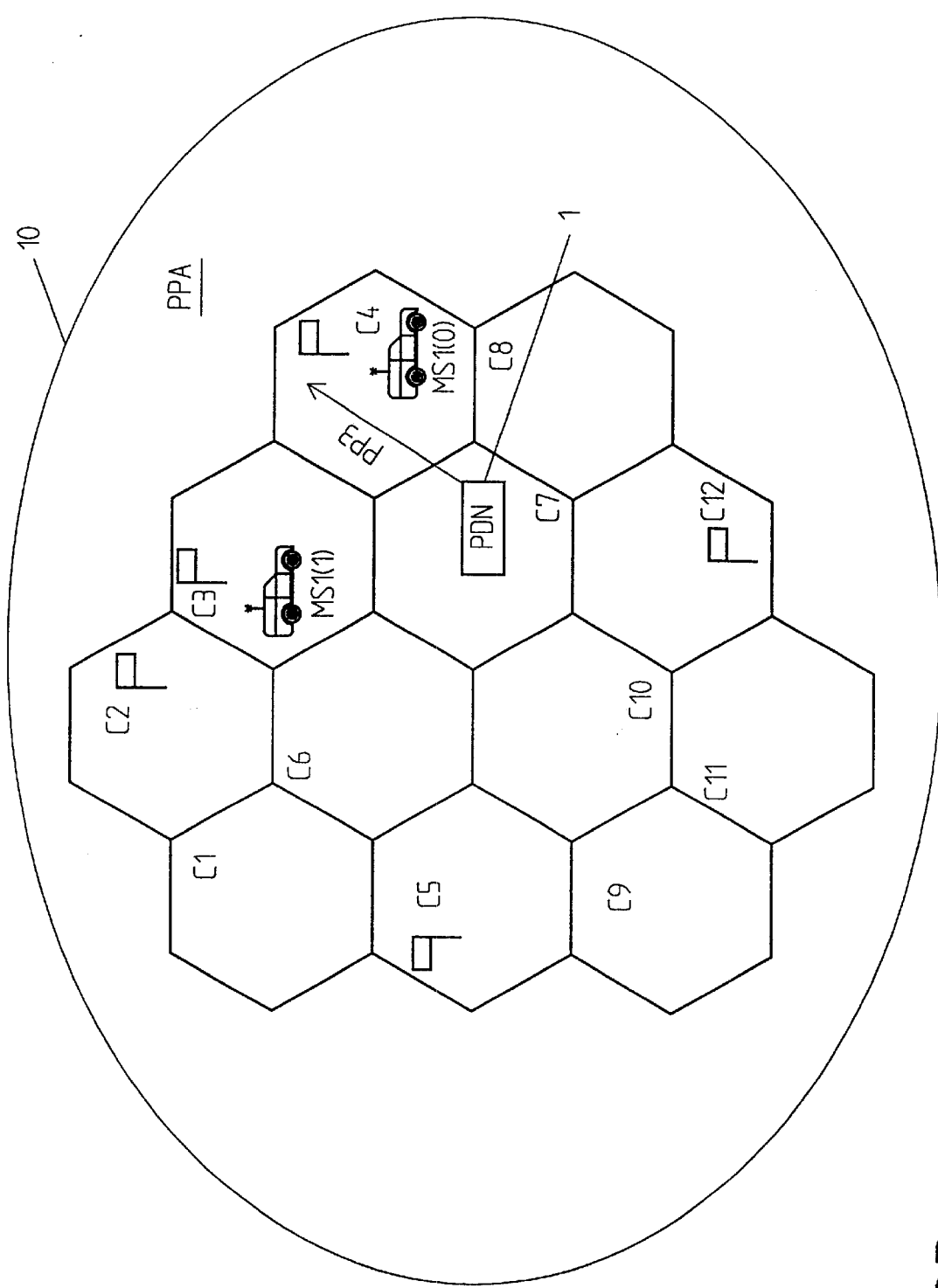

In a particular implementation of the present invention the inventive concept can also be used for voice paging messages on the UPCHs. If for example the MS4 is registered for packet data communication with the PDN 1, it listens to UPCH and if there is a speech connection request to the mobile station, it can not be reached in the conventional manner. The MSC 2 which receives the request then sends the request on to the PDN 1 and the PDN 1 sends a voice paging message on the UPCH in the manner as described above, using a first voice paging message on the calculated UPCH in all cells and if the MS4 does not respond before the paging timer expires, a second voice paging message is sent out on all UPCHs in all the updated cells and when the MS4 answers, the procedure is taken over by MSC 2, namely the set up of the voice call. Of course the implementation as illustrated through FIG. 3C can also be used in which case it may be necessary to send a third paging message (FIG. 3D). For such third paging message may also a timer be provided which is initiated when the second paging message is sent. Alternatively it may be initiated when a first paging message is sent. The same timer may also be used for the second paging message and the third paging message.

Figure 8:
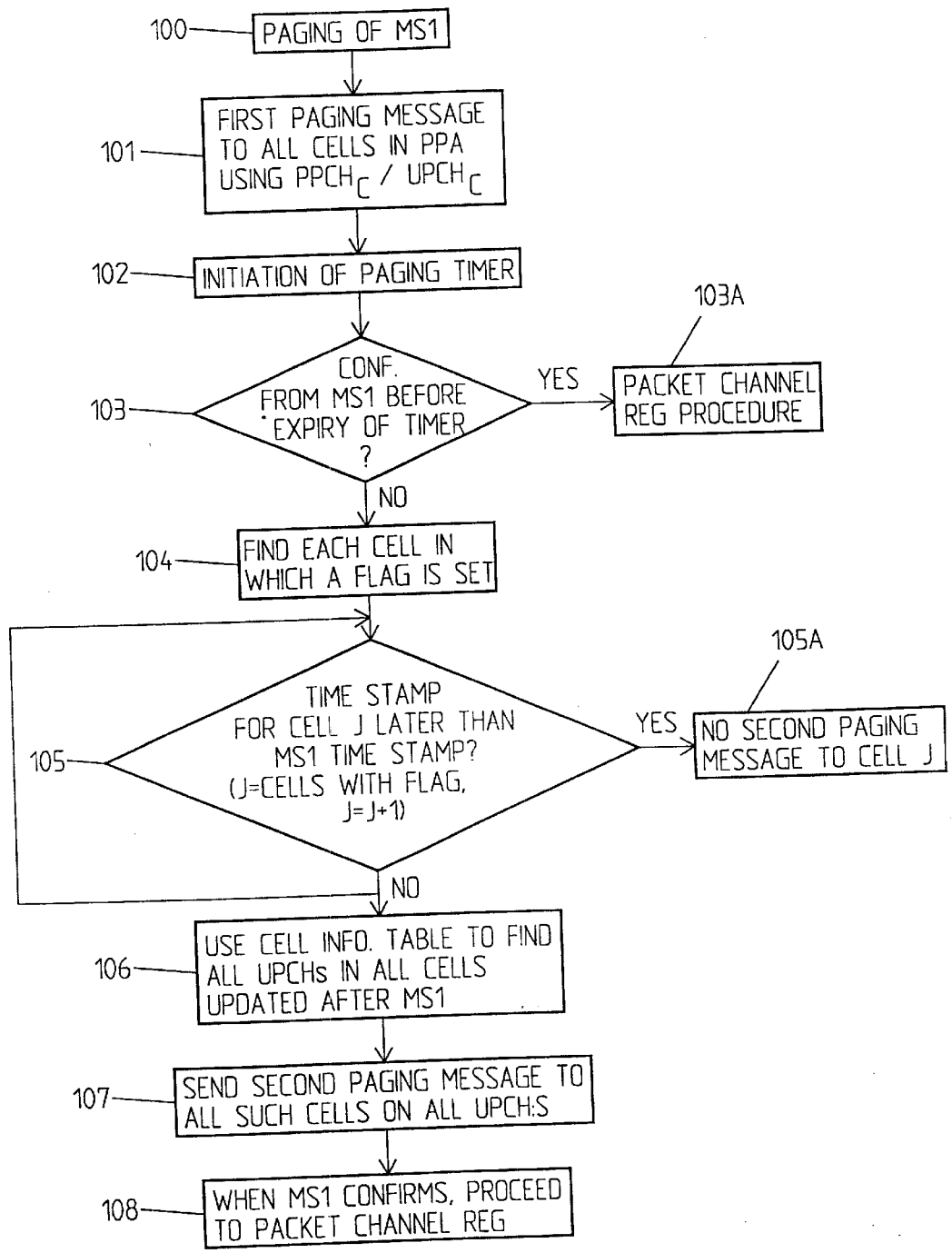
FIG. 8 is a flow diagram describing the paging of a mobile station in packet stand-by state.

In FIG. 8 the paging of a mobile station MS1 in packet stand-by state is illustrated. It is here supposed that MS1 is in a packet stand-by state and in that information on that has been provided to the PDN in the PPA in which MS1 is registered. When PDN needs to page MS1, 100, a first paging message is sent to all cells in the PPA within which MS1 is registered, 101. For this first paging message the calculated packet data communication resources are used, i.e. $PPCH_c/UPCH_c$. As referred to earlier more than one first paging message may be sent out but in this case it is, for reasons of simplicity, supposed that only one first paging message is sent out and in that the sending out of said first paging message substantially simultaneously initiates a paging timer, 102. Then is examined whether any confirmation response is received from MS1 before expiry of the paging timer, 103. If a confirmation message is received in PDN from MS1 before expiry of the paging timer, a conventional packet channel registration procedure will take place, 103A. If, on the other hand, no confirmation is received from MS1 before expiry of the timer, is examined, using the cell information handling means in PDN which cells have been updated, i.e. for which cells a flag is set, 104. As referred to earlier in the application a flag is set when a cell is updated, which flag is cleared at a later time which may be fixed or configurable. For the cells j in which a flag is set, it is then examined whether the time stamp of cell j is later than the time stamp of MS1. It is here supposed that the cells in which the flag is set are denoted cell j wherein j=1, . . . , z, z indicating the number of cells in which a flag is set within PPA, 105. If for cell j the MS1 time stamp is later than the cell j time stamp, no second paging message is sent to cell j, 105A. For the cells for which the time stamp is later than the MS1 time stamp, the cell information handling means in PDN is used to find all UPCHs in these cells, 106. A second paging message is then sent to all such cells on all UPCHs, 107 according to the first embodiment as illustrated through FIGS. 3A, 3B. When MS1 confirms that it has received the second paging message, it is proceeded to the packet channel registration procedure in a conventional manner, 108.

The invention is not limited to the particularly illustrated embodiments but it can be varied in a number of ways within the scope of the appended claims.

What is claimed is:

1. A cellular communication system supporting packet data communication, comprising:
   a number of switching arrangements for switching speech and/or circuit switched data,
   a number of packet data nodes, each controlling/serving the packet data communication in a number of packet paging areas,
   in each cell, a number of packet data communication channels being used for packet data communication, wherein each packet data node comprises mobile station information handling means keeping information about mobile stations registered in the cells covered by the packet paging areas covered by the packet data node and cell information handling means keeping information about packet data communication channels in the cells covered by the packet data node,
   means for calculating which packet data communication channel resources are to be used for mobile stations after updating of a cell, and
   means for keeping information about which cells have been updated,
   wherein when a cell is updated, paging of a mobile station in a stand-by state is performed by sending a number of first paging messages from the packet data node using the calculated packet data communication channel resources in all cells within the packet paging area in which the mobile station is registered, and if the mobile station is not found, a second paging message is sent out to all cells which have been updated.

2. A system according to claim 1, wherein a mobile station, registered with the packet data node for packet data communication, is entered in a packet stand-by state when no packet data has been communicated to/from the mobile station for a predetermined time period, and the packet data node contains means for keeping information on such entry.

3. A system according to claim 1, wherein a packet data communication channel using one frequency comprises a number of functional channels, each functional channel corresponding to one time slot on said frequency.

4. A system according to claim 3, wherein a packet data communication channel is comprises one, two or three functional channels.

5. A system according to claim 3, wherein in the calculating means, a calculation is performed to calculate which packet data communication channel resource is to be used by a mobile station in stand-by state after a cell update, and said calculating means also calculates which functional channel(s) on said packet data communication channel which is/are to be used for paging messages.

6. A system according to claim 5, wherein the first paging message(s) is/are sent on the calculated functional channel (s) in all cells within the packet paging area.

7. A system according to claim 6, wherein the second paging message is sent on all functional channels of all packet data communication channels in all updated cells within the packet paging area.

8. A system according to claim 1, wherein the mobile station information handling means keeps information about data communication traffic events relating to transmission/reception of data packets and registration events by the mobile stations in the packet paging area and further includes means for keeping information about the times at which such events occur.

9. A system according to claim 8, wherein the mobile station information handling means includes time stamping means stamping the time of each data communication event, at least the time stamp of the last event is stored, and also information about the data communication channel resource used at the event is stored.

10. A system according to claim 1, wherein the cell information means keeps information about which packet data communication channels are used in each cell within the packet paging area, including information about which are the functional channels used by said packet data communication channels and the means further include cell time stamping means stamping the time when a cell is updated.

11. A system according to claim 10, wherein the cell information handling means contains a cell update flag which is set when a cell is updated, and said flag is cleared when a time period has elapsed, said time period being predetermined, fixed or reconfigurable.

12. A system according to claim 1, wherein the packet data node includes a paging timer for which a time interval is given, upon the expiration of which a second paging message is sent out, said paging timer being initiated upon sending out of a first paging message.

13. A system according to claim 9, wherein the cell information means keeps information about which packet data communication channels are used in each cell within the packet paging area, including information about which are the functional channels used by said packet data communication channels and the means further include cell time stamping means stamping the time when a cell is updated, the packet data node includes a paging timer for which a time interval is given, upon the expiration of which a second paging message is sent out, said paging timer being initiated upon sending out of a first paging message, the packet data node includes comparing means for comparing the time stamp of each cell and the time stamp of the mobile station, and the second paging message is sent out to all cells for which the cell time stamp shows a later time than the mobile station time stamp.

14. A system according to claim 9, wherein the cell information handling means contains a cell update flag which is set when a cell is updated, said flag is cleared when a time period has elapsed, said time period being predetermined, fixed or reconfigurable, the packet data node includes a paging timer for which a time interval is given, upon the expiration of which a second paging message is sent out, said paging timer being initiated upon sending out of a first paging message, the cell time stamp of the cells for which a flag is set is compared to the time stamp of the mobile station, and the second paging message is sent to those cells for which the time stamp shows a time which is later than the time stamp of the mobile station.

15. A system according to claim 11, wherein the cell information handling means includes means for holding information about the identities of all cells, cell update time stamps, cell update flags, the packet paging areas to which the cells belong and about which functional channels the packet data communication channels, used by the cells, comprise.

16. A system according to claim 3, wherein a second paging message is sent on all functional channels of all packet data communication channels of all updated cells except for the cell in which the mobile station is registered, in which cell, if updated, the paging message is sent on the packet data communication channel on which a mobile station is registered and on the calculated packet data communication channel resource(s).

17. A system according to claim 16, wherein if the mobile station is not found by the second paging message, a third paging message is sent out, preferably upon expiration of a timer, said third message being sent out in the cell in which the mobile station is registered at least on the channel resources on which the second paging message was not sent.

18. An arrangement for paging a mobile station in a stand-by state in a cellular communication system supporting packet data communication, the arrangement comprising:
 a packet data node controlling a number of packet paging areas each containing a number of cells, said packet data node comprising mobile station information handling means keeping information about mobile stations registered with it and cell information handling means keeping information about packet data communication channels used for packet data communication in the cells in the packet paging areas, and
 calculating means for calculating which packet data communication channel resource that is to be used by the mobile station when a cell has been updated,
 wherein when a cell is updated, paging of the mobile station is performed by sending a number of first paging messages from the packet data node on the calculated packet data communication channel resource in all cells within the packet paging area in which the mobile station is registered, and if the mobile station is not found, a second paging message is sent out to all cells which have been updated using all packet data communication channel resources of such cells or using all packet data communication channel resources of such cells except the cell in which the mobile station is registered.

19. An arrangement according to claim 18, wherein a packet data communication channel using one frequency comprises one, two or three functional channels, each functional channel corresponding to one time slot on said frequency.

20. An arrangement according to claim 18, wherein in the calculating means a calculation is performed to calculate which packet data communication channel is to be used by the mobile station after the cell update, and said calculating means also calculates which functional channel(s) on said packet data communication channel is/are to be used for paging messages.

21. An arrangement according to claim 20, wherein the first paging message(s) is/are sent on the calculated functional channel(s) in all cells within the packet paging area.

22. An arrangement according to claim 21, wherein the second paging message is sent on all functional channels of all packet data communication channels in all updated cells within the packet paging area including the cell in which the mobile station is registered if it is updated.

23. An arrangement according to claim 21, wherein the second paging message is sent on all functional channels in all cells within the packet paging area except in the cell in which the mobile station is registered, in which, in case it is updated, the second paging message only is sent on the calculated functional channel and on the functional channel on which it is registered.

24. An arrangement according to claim 23, wherein if the mobile station is not successfully paged by the second paging message, a third paging message is sent out in the cell in which the mobile station is registered, at least on the functional channels on which the second paging message was not sent.

25. An arrangement according to claim 22, wherein the mobile station information handling means keeps information about data communication traffic or registration events of the mobile station, mobile station stamping means are provided for stamping the time at which such events occur, the cell information handling means keep information about which packet data communication channel resources are used in each cell within the packet paging area, including information about which functional channels of the corresponding packet data communication channels are used, and cell time stamping means are provided for stamping the time when a cell is updated.

26. A system according to any one of claim 18, wherein the packet data node includes a paging timer for which a time interval is given, upon the expiration of which a second paging message is sent out, said timer being initiated upon sending out of the (a) first paging message.

27. An arrangement according to claim 26, wherein the second paging message is sent out to all cells having a time stamp which is later than the time stamp of the mobile station.

28. Method of paging a mobile station in a cellular communication system supporting packet data communication, said mobile station being in a stand-by state and registered in a packet paging area controlled by a packet data node, the method comprising the steps of:

sending a first paging message to all cells within the packet paging area in which the mobile station is registered using up-to-date packet data communication channel resources in each cell, waiting for a given period of time for confirmation that the mobile station has received the first paging message, and, if no confirmation is received within the predetermined time period, examining for each cell whether the cell has been updated since a last packet data communication event between the packet data node and the mobile station, sending a second paging message to all cells having been updated since the last contact between the packet data node and the mobile station, said second paging message being sent on all packet data communication channel resources, at least in all cells in which the mobile station is not registered.

29. A method according to claim 28, further comprising the steps of:

calculating which packet data communication channel resource that the mobile station should use in the cell when the cell has been updated, including calculation of which functional channel, among a number of functional channels which the packet data communication channel comprises, the mobile station should use.

30. A method according to claim 29, further comprising the steps of:

sending the first paging message on the calculated functional channel (s) in all cells within the packet paging area, and sending the second paging message on all functional channels of all packet data communication channels in all updated cells within the packet paging area.

31. A method according to claim 30, further comprising the steps of:

stamping the time for packet data communication events relating to the mobile station in the packet data node, stamping the time for each cell when it is updated, examining which cells have been updated since the last time stamped data communication event relating to the mobile station, and sending the second paging message to the cells having being updated after the last time stamp relating to the mobile station.

32. A method according to claim 28, further comprising the steps of:

sending a second paging message on the calculated functional channel and on the registered functional channel in the cell in which the mobile station is registered, and if that cell is updated, sending the second paging message on all functional channels in all other cells having been updated, if no confirmation is received from the mobile station that it has received the second paging message, sending a third paging message in the cell in which the mobile station is registered using at least all functional channels which were not used when sending the second paging message.

33. A method according to claim 28, further comprising the step of performing voice paging of the mobile station by a voice paging message on the functional channel.

* * * * *